United States Patent
Lepaksha et al.

(10) Patent No.: US 12,450,063 B2
(45) Date of Patent: Oct. 21, 2025

(54) MAINTAINING APPROXIMATE UNIFORMITY OF AGING OF EQUIVALENT PROCESSING CIRCUITS IN A PIPELINE STAGE(S) IN A PROCESSOR

(71) Applicant: QUALCOMM Incorporated, San Diego, CA (US)

(72) Inventors: Hithesh Hassan Lepaksha, Hyderabad (IN); Darshan Kumar Nandanwar, Bangalore (IN); Linga Achuta Ram Kumar Nimmala, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 18/533,711

(22) Filed: Dec. 8, 2023

(65) Prior Publication Data
US 2025/0190219 A1    Jun. 12, 2025

(51) Int. Cl.
*G06F 9/38* (2018.01)
*G06F 9/30* (2018.01)

(52) U.S. Cl.
CPC ........ *G06F 9/30145* (2013.01); *G06F 9/3822* (2013.01); *G06F 9/3836* (2013.01)

(58) Field of Classification Search
CPC .. G06F 11/202; G06F 11/263; G06F 9/30145; G06F 9/3836; G06F 11/3024; G06F 9/3822
USPC ...................................................... 714/47.1
See application file for complete search history.

(56) References Cited

U.S. PATENT DOCUMENTS

| | | | |
|---|---|---|---|
| 9,407,272 B2 * | 8/2016 | Penzes | H03K 19/01 |
| 2007/0300086 A1 * | 12/2007 | Kwasnick | G06F 9/5027 |
| | | | 713/300 |
| 2008/0126748 A1 * | 5/2008 | Capps | G06F 11/2041 |
| | | | 712/30 |

(Continued)

OTHER PUBLICATIONS

Srinivasan, Jayanth, Sarita V. Adve, Pradip Bose, and Jude A. Rivers. "Exploiting structural duplication for lifetime reliability enhancement." In 32nd International Symposium on Computer Architecture (ISCA'05), pp. 520-531. IEEE, 2005. (Year: 2005).*

(Continued)

*Primary Examiner* — Keith E Vicary
(74) *Attorney, Agent, or Firm* — W&T

(57) ABSTRACT

Apparatus and methods for maintaining approximate uniformity of aging of equivalent processing circuits in a pipeline stage(s) in a processor are disclosed. The processor includes one or more processing units that include one or more pipelines. A pipeline includes a series of pipeline stages each of which performs a particular function. In this regard, the processor also includes an age management circuit (AMC) configured to store performance factors indicative to aging of the equivalent processing circuits in a pipeline stage. In response to work input into a given pipeline stage, the AMC is further configured to route the work input to one of the equivalent processing circuits in the pipeline stage based on the stored performance factors. In so doing, the AMC controls the frequency of use of the equivalent processing circuits in its pipeline stage to substantially maintain uniform aging of the equivalent processing circuits.

20 Claims, 5 Drawing Sheets

(56) References Cited

U.S. PATENT DOCUMENTS

| | | | | |
|---|---|---|---|---|
| 2009/0094481 | A1* | 4/2009 | Vera | G06F 11/202 714/11 |
| 2009/0288092 | A1* | 11/2009 | Yamaoka | G06F 9/5033 718/104 |
| 2010/0107166 | A1* | 4/2010 | Topaloglu | G06F 9/5094 718/102 |
| 2011/0246093 | A1* | 10/2011 | Wood | G06F 11/008 702/182 |
| 2011/0265090 | A1* | 10/2011 | Moyer | G06F 1/3203 707/812 |
| 2012/0297036 | A1* | 11/2012 | Frank | H04L 12/12 709/221 |
| 2013/0086395 | A1* | 4/2013 | Liu | G06F 9/5094 713/300 |
| 2013/0158892 | A1* | 6/2013 | Heron | G06F 11/008 702/34 |
| 2014/0068298 | A1* | 3/2014 | Simeral | G06F 11/3003 713/300 |
| 2014/0101670 | A1* | 4/2014 | Bae | G06F 9/505 718/105 |
| 2014/0181596 | A1* | 6/2014 | Rusu | G06F 11/3058 714/47.3 |
| 2014/0359350 | A1* | 12/2014 | Plank | G06F 11/0724 714/10 |
| 2015/0281015 | A1* | 10/2015 | Griffith | H04L 43/065 709/224 |
| 2017/0199798 | A1* | 7/2017 | Jain | G06F 11/3024 |
| 2017/0277455 | A1* | 9/2017 | Sunada | G06F 11/2284 |
| 2018/0143853 | A1* | 5/2018 | Saeidi | G06F 9/5027 |
| 2019/0278741 | A1* | 9/2019 | Hovis | G11C 29/4401 |
| 2020/0202215 | A1* | 6/2020 | Sadowski | G06N 3/063 |

OTHER PUBLICATIONS

Siddiqua, Taniya, and Sudhanva Gurumurthi. "Nbti-aware dynamic instruction scheduling." In Proceedings of the 5th Workshop on Silicon Errors in Logic-System Effects. 2009. 6 pages. (Year: 2009).*

Romanescu, Bogdan F., and Daniel J. Sorin. "Core cannibalization architecture: improving lifetime chip performance for multicore processors in the presence of hard faults." In Proceedings of the 17th international conference on Parallel architectures and compilation techniques, pp. 43-51. 2008. (Year: 2008).*

Oboril, Fabian, and Mehdi B. Tahoori. "Exploiting instruction set encoding for aging-aware microprocessor design." ACM Transactions on Design Automation of Electronic Systems (TODAES) 21, No. 1 (2015): 1-26. (Year: 2015).*

Hong, Hyejeong, Jaeil Lim, Hyunyul Lim, and Sungho Kang. "Lifetime reliability enhancement of microprocessors: Mitigating the impact of negative bias temperature instability." ACM Computing Surveys (CSUR) 48, No. 1 (2015): 1-25. (Year: 2015).*

Basoglu, Mehmet, Michael Orshansky, and Mattan Erez. "NBTI-aware DVFS: A new approach to saving energy and increasing processor lifetime." In Proceedings of the 16th ACM/IEEE international symposium on Low power electronics and design, pp. 253-258. 2010. (Year: 2010).*

International Search Report and Written Opinion for International Patent Application No. PCT/US2024/055450, mailed Feb. 26, 2025, 13 pages.

Kriebel F., et al., "ageOpt-RMT: Compiler-Driven Variation-Aware Aging Optimization for Redundant Multithreading", Proceedings of the 53rd Annual Design Automation Conference on, DAC '16, ACM Press, New York, USA, Jun. 5, 2016, 6 Pages, XP058258989, The Whole Document.

Rehman S., et al., "Hardware and Software Techniques for Heterogeneous Fault-Tolerance", 2018 IEEE 24th International Symposium on On-line Testing and Robust System Design (IOOLTS), IEEE, Jul. 2, 2018, pp. 115-118, XP033409863, Abstract, figures 1-4, p. 115, right-hand column—p. 118, left-hand column.

Rehman S., et al., "Reliable Software for Unreliable Hardware: Embedded Code Generation Aiming at Reliability", Hardware/Software Codesign and System Synthesis (CODES+ISSS), 2011 Proceedings of the 9th International Conference on, IEEE, 2 Penn Plaza, Suite 701 New York NY 10121-0701 USA, Oct. 9, 2011, pp. 237-246, XP058005124, The Whole Document.

* cited by examiner

MAINTAINING APPROXIMATE UNIFORMITY OF AGING OF EQUIVALENT PROCESSING CIRCUITS IN A PIPELINE STAGE(S) IN A PROCESSOR

BACKGROUND

I. Field of the Disclosure

The field of the disclosure relates to routing work within a pipeline stage in a processor-based system (e.g., a graphics processing unit (GPU)-based system, a central processing unit (CPU)-based system), and more particularly to apparatus and methods for uniformly aging redundancy circuits in a pipeline stage.

II. Background

Processors include one or more microprocessors, also known as cores. Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU), A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions that instruct a processor to fetch data from a location in memory and to perform one or more processor operations using the fetched data. The result may then be stored in memory. For example, this memory can be a cache memory local to the PU, a shared local cache among PUs in a PU block, a shared cache among multiple PU blocks, and/or a system memory in a processor-based system. Cache memory, which can also be referred to as just "cache," is a smaller, faster memory that stores copies of data stored at frequently accessed memory addresses in a main memory or higher-level cache memory to reduce memory access latency. Thus, a cache memory can be used by a PU to reduce memory access times.

A PU includes pipeline stages to perform one or more operations utilizing the fetched data. When processing an instruction, at each pipeline stage, there may be equivalent circuitry to perform the function at a particular pipeline stage to process the instruction. An example of equivalent circuitry at a pipeline stage includes multiple decode circuits at a decode stage to increase parallel operation, and thus throughput of that stage.

SUMMARY

Aspects disclosed in the detailed description include maintaining approximate uniformity of aging of equivalent processing circuits in a pipeline stage(s) in a processor. The processor includes one or more processing units (each one also referred to as a "core") that includes one or more pipelines. A pipeline includes a series of pipeline stages each of which performs a particular function in its particular pipeline stage. For example, a pipeline stage can include a fetch stage, a decode stage, and an execution stage. Some pipeline stages in a pipeline include redundancy processing circuits to provide multiple lanes in the pipeline stage that can process multiple instruction or instructions of increased bit width to increase throughput of the overall pipeline stage. Many factors, unpredictable at the time of designing the PU, impact aging of the equivalent processing circuits including factors such as negative bias temperature instability (NBTI), hot carrier injection (HCI), and temperature gradients on a semiconductor chip in which the PU is deployed. In this regard, the processor also includes an age management circuit (AMC) configured to store performance factors indicative of aging of the equivalent processing circuits in a pipeline stage. In response to work input into a given pipeline stage, the AMC is further configured to route the work input to one of the equivalent processing circuits in the pipeline stage based on the stored performance factors. In so doing, the AMC controls the frequency of use of the equivalent processing circuits in its pipeline stage to substantially maintain uniform aging of the equivalent processing circuits. Substantially maintaining uniformity of aging of equivalent processing circuits in a pipeline stage(s) in a pipeline can advantageously save power and increase the mean time to failure of the collective equivalent processing circuits in the respective pipeline stages. This approach to maintaining approximate uniformity of aging may be particularly important in a processor with multiple PUs deployed in a single semiconductor chip, also known as multi-core chips, which is deployed in mobile vehicles for example, whose lifespan is typically longer than deployments of multi-core chips for other devices and applications, such as tablets, PCs, and mobile phones.

In this regard in one aspect, a processor comprising a first processing unit is disclosed. The first processing unit comprising a first pipeline comprising a plurality of first pipeline stages, a first pipeline stage of the plurality of first pipeline stages comprising a plurality of first equivalent processing circuits. The first processing unit also comprising an age management circuit (AMC) configured to store a plurality of first performance factors indicative of aging of and corresponding to the plurality of first equivalent processing circuits in the first pipeline stage, and in response to a first work input, the AMC is further configured to route the first work input to one of the plurality of first equivalent processing circuits based on a first performance factor of the plurality of first performance factors.

In another aspect, a method for maintaining approximate uniformity of aging of equivalent processing circuits in a first processing unit is disclosed. The first processing unit comprising a first pipeline comprising a plurality of first pipeline stages, a first pipeline stage of the plurality of first pipeline stages comprising a plurality of first equivalent processing circuits. The method comprising storing a plurality of first performance factors indicative of aging of and corresponding to the plurality of first equivalent processing circuits in the first pipeline stage and, in response to a first work input, routing the first work input to one of the plurality of first equivalent processing circuits based on a first performance factor of the plurality of first performance factors.

In another aspect, a processor for maintaining approximate uniformity of aging of equivalent processing circuits in a first processing unit. The first processing unit comprising a first pipeline comprising a plurality of first pipeline stages, a first pipeline stage of the plurality of first pipeline stages comprising a plurality of first equivalent processing circuits. The processor comprising means for storing a plurality of first performance factors indicative of aging of and corresponding to the plurality of first equivalent processing circuits in the first pipeline stage and, in response to a first work input, means for routing the first work input to one of the plurality of first equivalent processing circuits based on a first performance factor of the plurality of first performance factors.

DETAILED DESCRIPTION

Figure 1:
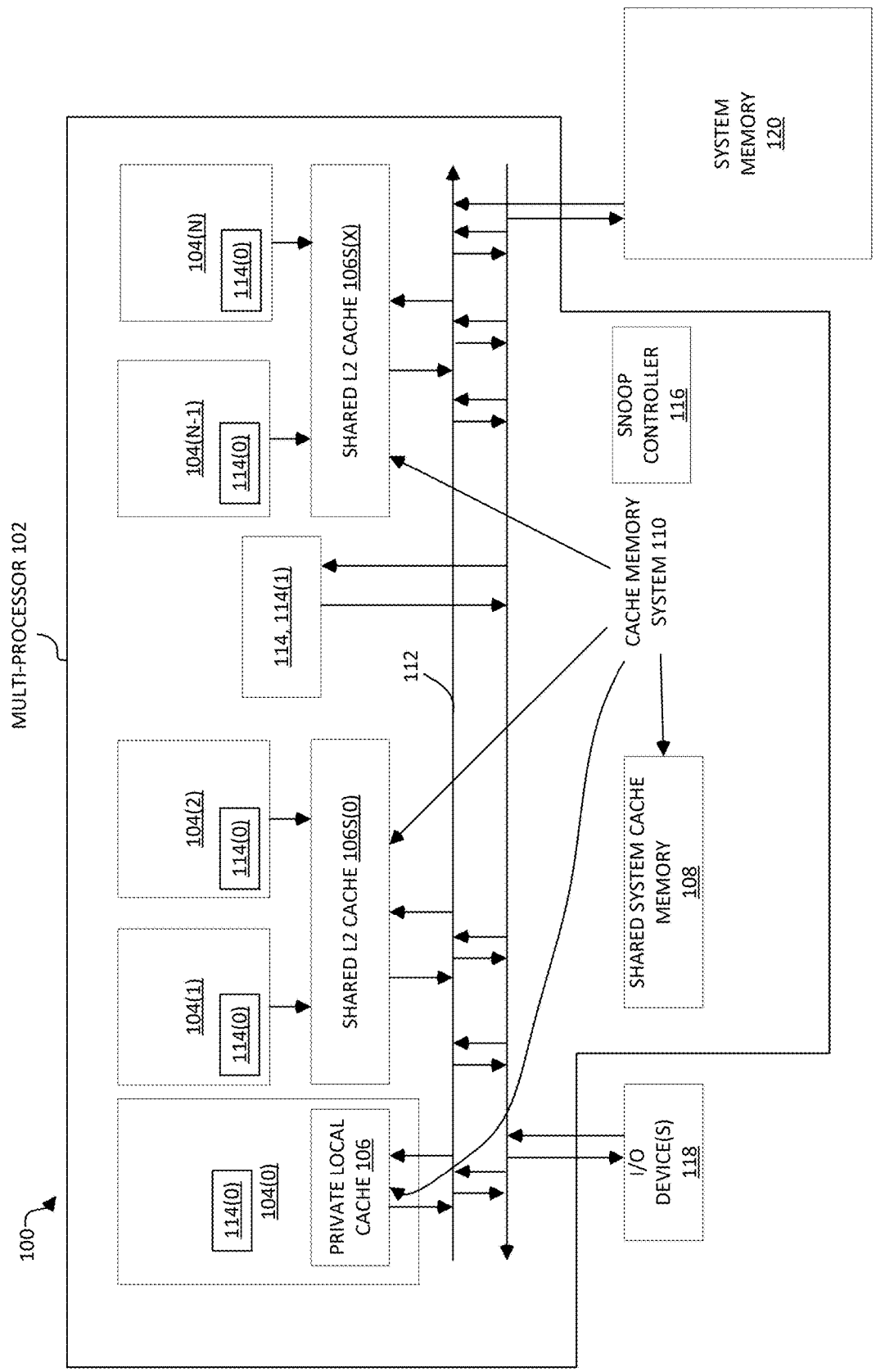
FIG. 1 is a block diagram of an exemplary processor-based system that includes multiple processing units (PUs) and a memory system that includes a cache memory system including a hierarchy of local and shared cache memories and a system memory, and wherein the processor-based system includes an exemplary age management circuit (AMC) to route, based on stored performance factors of equivalent processing circuits in a pipeline stage, input work to maintain approximate uniformity of aging of the equivalent processing circuits.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include maintaining approximate uniformity of aging of equivalent processing circuits in a pipeline stage(s) in a processor. The processor includes one or more processing units (each one also referred to as a "core") that includes one or more pipelines. A pipeline includes a series of pipeline stages each of which performs a particular function. For example, a pipeline stage can include a fetch stage, a decode stage, and an execution stage. Some pipeline stages in a pipeline include redundancy processing circuit to provide multiple lanes in the pipeline stage that can process one or more instructions of increased bit width to increase throughput of the overall pipeline stage. Many factors, unpredictable at the time of designing the PU, impact aging of the equivalent processing circuits including factors including, but not limited to, negative bias temperature instability (NBTI), hot carrier injection (HCI), and temperature gradients on a semiconductor chip in which the PU is deployed. In this regard, the processor also includes an age management circuit (AMC) configured to store performance factors indicative to aging of the equivalent processing circuits in a pipeline stage. In response to work input to a given pipeline stage, the AMC is further configured to route the work input to one of the equivalent processing circuits in the pipeline stage based on the stored performance factors. In so doing, the AMC controls the frequency of use of the equivalent processing circuits in its pipeline stage to substantially maintain uniform aging of the equivalent processing circuits. Substantially maintaining uniformity of aging of equivalent processing circuits in a pipeline stage(s) in a pipeline can advantageously save power and increase the mean time to failure of the collective equivalent processing circuits in the respective pipeline stages. This approach to maintaining approximate uniformity of aging may be particularly important in a processor with multiple PUs deployed in a single semiconductor chip, also known as multi-core chips, which is deployed in mobile vehicles for example, whose lifespan is typically longer than deployments of multi-core chips for other devices and applications, such as tablets, PCs, and mobile phones.

In this regard, FIG. 1 is a block diagram of an exemplary processor-based system 100 that includes an exemplary age management circuit (AMC) to route, based on stored performance factors of equivalent processing circuits in a pipeline stage, input work to maintain approximate uniformity of aging of the equivalent processing circuits. Before discussing these aspects, other exemplary aspects of the processor-based system 100 are first described below.

The processor-based system 100 includes multiple (multi-) processing unit (PU) (multi-PU) processor 102, or also known as a multi-processor, that includes multiple PUs 104(0)-104(N) and a hierarchical memory system. As part of the hierarchical memory system, for example, PU 104(0) includes a private local cache memory 106, which may be a Level 2 (L2) cache memory. PUs 104(1), 104(2) and PUs 104(N-1), 104(N) are configured to interface with respective local shared cache memories 106S(0)-106S(X), which may also be L2 cache memories for example. If a data read request requested by a PU 104(0)-104(N) results in a cache miss to the respective cache memories 106, 106S(0)-106S(X), the read request may be communicated to a next-level cache memory, which in this example is a shared system cache memory 108. For example, the shared system cache memory 108 may be a Level 3 (L3) cache memory. The cache memory 106, the local shared cache memories 106S(0)-106S(X), and the shared system cache memory 108 are part of a hierarchical cache memory system 110. An interconnect bus 112, which may be a coherent bus, is provided that allows each of the PUs 104(0)-104(N) to access the local shared cache memories 106S(0)-106S(X) (if shared to the PU 104(0)-104(N)), the shared system cache memory 108, and other shared resources coupled to the interconnect bus 112.

The processor-based system 100 in FIG. 1 includes an age management circuit (AMC) 114 that is configured to store performance factors indicative of aging of and corresponding to equivalent processing circuits in a pipeline stage. In response to work input to the pipeline stage, the AMC 114 is further configured to route the work input to one of the equivalent processing circuits in the pipeline stage based on the performance factors to maintain approximate uniformity of aging of the equivalent processing circuits in the pipeline stage of a processing unit. More detail of the AMC 114 including pipelines, pipeline stages, and equivalent processing circuits in a pipeline stage will be discussed in connection with the discussion of FIG. 2. The AMC 114 may be deployed in a PU shown as AMC 114(0) or may be distributed between a local AMC 114(0), which resides in any or all PUs 104(0)-104(N), and a remote AMC 114(1), which resides in the multi-PU processor 102. The remote AMC 114(1) may alternatively reside in the interconnect bus 112.

With continuing reference to FIG. 1, the processor-based system 100 in this example also includes a snoop controller 116, which is also coupled to the interconnect bus 112. The snoop controller 116 is a circuit that monitors or snoops cache memory bus transactions on the interconnect bus 112 to maintain cache coherency among the cache memories 106, 106S(0)-106S(X), 108 in the cache memory system 110. Other shared resources that can be accessed by the PUs 104(0)-104(N) through the interconnect bus 112 can include input/output (I/O) devices 118 and a system memory 120 (e.g., a dynamic random access memory (DRAM)). If a cache miss occurs for a read request issued by a PU 104(0)-104(N) in each level of the cache memories 106, 106S(0)-106S(X), 108 accessible for the PU 104(0)-104(N), the read request is serviced by the system memory 120, and the data associated with the read request is installed in the cache memories 106, 106S(0)-106S(X), 108 associated with the requesting PU 104(0)-104(N).

Figure 2:
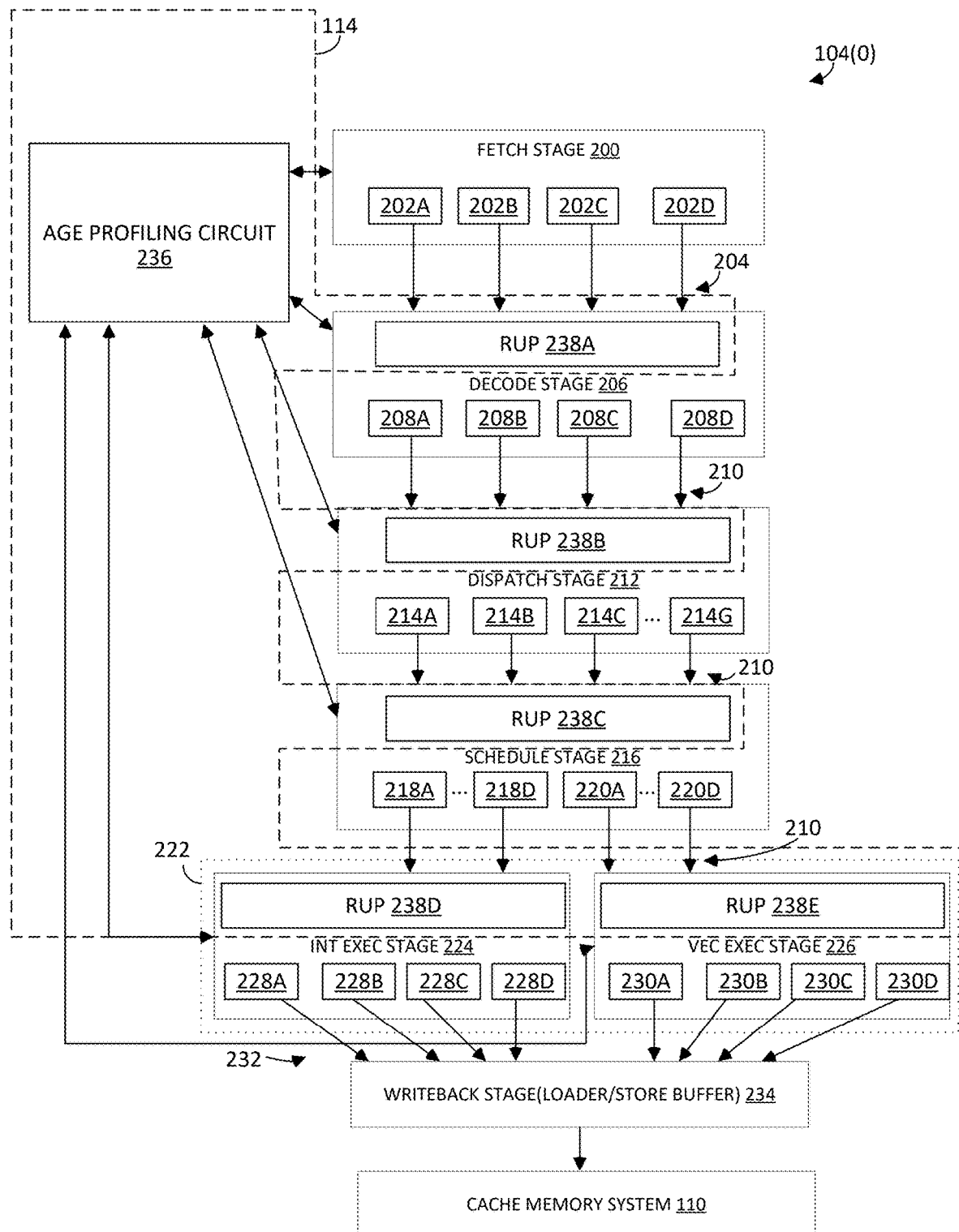
FIG. 2 is a block diagram of the exemplary AMC and a PU in FIG. 1 in more detail.

FIG. 2 is a block diagram of an exemplary AMC 114 and a processing unit, such as PU 104(0) in FIG. 1 in more detail. FIG. 2 will also be discussed in connection with FIGS. 3A-3B and 4. PU 104(0), in this example, includes six pipeline stages where most of each pipeline stage receives work input and routes the work input to a equivalent processing circuit in the respective pipeline stage. The six pipeline stages include a fetch stage 200 which includes equivalent processing circuits 202A-202D, each of which is configured to fetch instructions 204 from the cache memory system 110 and system memory 120; a decode stage 206 which includes equivalent processing circuits 208A-208D, each of which is configured to decode instructions 204, as work input, into micro-operation (micro-op) signals 210; and a dispatch stage 212 which includes equivalent processing circuits 214A-214G, each of which is configured to route the micro-op signals 210, as work input, to a schedule stage 216. The schedule stage 216 is one of the six pipeline stages of the PU 104(0) and includes equivalent processing circuits 218A-218D and 220A-220D, each of which is configured to schedule the micro-op signals 210, as work input, to an execution stage 222. The execution stage 222 is one of the six pipeline stages of the PU 104(0) and includes an integer execution stage 224 and a vector execution stage 226. The equivalent processing circuits 218A-218D are configured to schedule micro-op signals 210 for execution at the integer execution stage 224. The integer execution stage 224 includes equivalent processing circuits 228A-228D, each of which is configured to perform integer operations on the micro-op signals 210. The equivalent processing circuits 220A-220D are configured to schedule micro-op signals 210 for execution at the vector execution stage 226. The vector execution stage 226 includes equivalent processing circuits 230A-230D, each of which is configured to perform vector operations on the micro-op signals 210. Results 232 of the execution stage 222 are sent to a writeback stage 234, the sixth pipeline stage of the PU 104(0). The writeback stage 234 includes circuitry to write back the results 232 to the cache memory system 110.

For simplicity, the PU 104(0) is depicted to show six pipeline stages; the fetch stage 200, the decode stage 206, the dispatch stage 212, the schedule stage 216, the execution stage 222, and the writeback stage 234. However, the PU 104(0) may include additional pipeline stages. Also for simplicity, the PU 104(0) is depicted to include two pipelines: one defined by a path between the fetch stage 200, the decode stage 206, the dispatch stage 212, the schedule stage 216, the integer execution stage 224, and the writeback stage 234; and the other defined by another path between the fetch stage 200, the decode stage 206, the dispatch stage 212, the schedule stage 216, the vector execution stage 226, and the writeback stage 234. Please note there could be implied additional pipelines within those paths based on various factors including the width of the fetched instruction, the number of lanes a particular equivalent circuit can handle, and the extent of redundancy between equivalent circuits. Also for simplicity, the PU 104(0) is shown to have a particular number of equivalent processing circuits at each pipeline stage. The number of equivalent processing circuits at each pipeline stage may vary based on various design points. Regarding equivalent processing circuits at a respective pipeline stage, the extent of redundancy between equivalent processing circuits may vary and need not be exactly the same. For example, the equivalent processing circuits 228A-228D are equivalent to the extent the micro-op signals 210 can be executed similarly by the equivalent processing circuits 228A-228D. Equivalent processing circuit 228A may be an arithmetic logic unit that can perform integer operations on either a 32-bit micro-op signal or a 64-bit micro-op signal while equivalent processing circuit 228B may be another arithmetic logic unit that can perform integer operation on only a 64-bit micro-op signal. If the micro-op signal is a 64-bit micro-op signal, the processing circuits 222A and 222B are considered equivalent for the particular 64-bit micro-op signal.

Returning to the AMC 114, the AMC 114 includes an age profiling circuit 236 and resource utilization and priority encoder (RUP) circuits 238A-238E. In general, the RUP circuits 238A-238E are configured to route work input such as the instructions 204 and micro-op signals 210 to equivalent processing circuits at their respective pipeline stage based on priority factors such as availability of the respective equivalent processing circuits. Additionally, in response to a work input, the RUP circuits 238A-238E are configured to route the work input to one of the equivalent processing circuits in the pipeline stage in which a RUP circuit resides based on a performance factor indicative of aging. A performance factor indicative of aging may be based on a measurement of throughput through a particular equivalent processing circuit. The throughput through a particular equivalent processing circuit can be measured by the number of transactions for a specific time or the amount of time it takes to accomplish a fixed number of transactions. For example, the throughput of the equivalent processing circuits 208A-208D in the decode stage 206 may be measured by the age profiling circuit 236 sending a fixed number of instructions to each equivalent processing circuits 208A-208D and determining the time it takes for each of the equivalent processing circuits 208A-208D to process the fixed number of instructions. Alternatively, the throughput of the equivalent processing circuits 208A-208D in the decode stage 206 may be measured by the age profiling circuit 236 setting a timer to a fixed time and sending instructions to each equivalent processing circuit 208A-208D and determining the number of instructions successfully decoded within the fixed time. The equivalent processing circuits 208A-208D in the decode stage 206 may individually be measured by the age profiling circuit 236 at every boot-up of the PU 104(0) or at a scheduled boot-up time. Boot-up time occurs when power is initially supplied to the multi-processor 102, also known as a cold boot-up or when the PU 104(0) is individually reset, also known as a warm boot-up. A more detailed example for measuring the equivalent processing circuits 208A-208D in the decode stage 206 will be discussed in connection with FIG. 4. Measurements of equivalent processing circuits at other pipeline stages are similar except that sample micro-op signals are sent from the age profiling circuit 236 to the other pipeline stages as opposed to sample instructions.

Figure 3A:
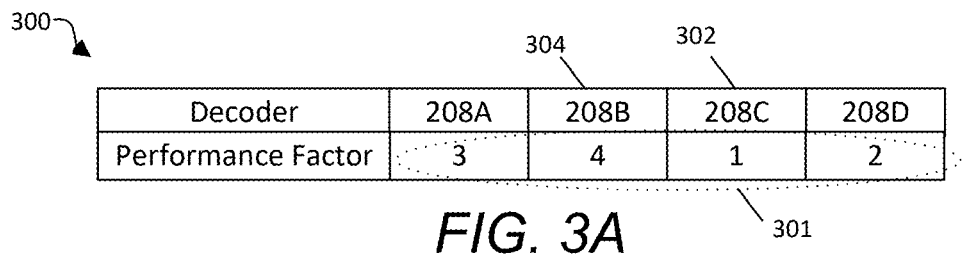
FIG. 3A is a table of exemplary performance factors indicative of aging of equivalent processing circuits in a decode pipeline stage stored in either the exemplary AMC of FIGS. 1 and 2 or in the resource utilization priority circuit in FIG. 2.

FIG. 3A is a table 300 of exemplary performance factors 301 indicative of aging of the equivalent processing circuits 208A-208D in the decode stage 206 stored in either the exemplary AMC 114 of FIG. 1 or 2 or in the RUP circuit 238A in FIG. 2. The table 300 stores a performance factor corresponding to respective equivalent processing circuits 208A-208D wherein the lowest value is indicative of the youngest equivalent processing circuit 302 and the highest value is indicative of the oldest equivalent processing circuit 304.

Figure 3B:
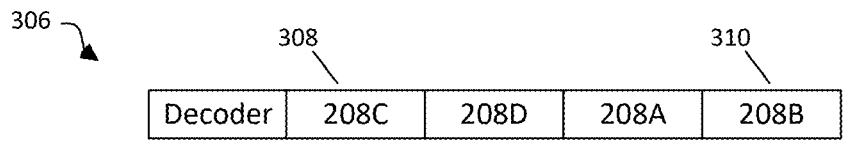
FIG. 3B is an ordered list of an exemplary order of equivalent processing circuits in a decode pipeline stage based on stored performance factors indicative of aging in the exemplary AMC of FIGS. 1 and 2.

Rather than referring to a stored table such as the table 300, an ordered list may be stored wherein the performance factors are utilized to maintain the ordered list. FIG. 3B is an ordered list 306 of an exemplary order of equivalent processing circuits in a decode pipeline stage whose order is based on measured performance factors indicative of aging in the exemplary AMC 114 of FIGS. 1 and 2. A first position 308 illustrates that equivalent processing circuit 208C is the youngest circuit while a last position 310 illustrates that equivalent processing circuit 208B is the oldest circuit.

In response to an instruction 204, the RUP circuit 238A in the decode stage 206 selects the youngest available equivalent circuit, either from a table of performance factors such as the table 300 or an ordered list such as the ordered list 306, to route the instruction for decoding. Assuming equivalent processing circuit 208C is available, the RUP circuit 238A selects equivalent processing circuit 208C to decode the instruction. The table 300 or the alternative ordered list 306 may be stored in the RUP circuit 238A or may be stored in the age profiling circuit 236 and accessed by the RUP circuit 238A in response to an instruction 204.

RUP circuits 238B-238E operate in a similar manner in that each RUP circuit 238B-238E would include a respective table, ordered list, or combination of the two, similar to the table 300 or the ordered list 306, and, in response to work input, such as the micro-op signals 210, select the youngest equivalent processing circuit in the pipeline stage to process the micro-ops signals 210.

Figure 4:
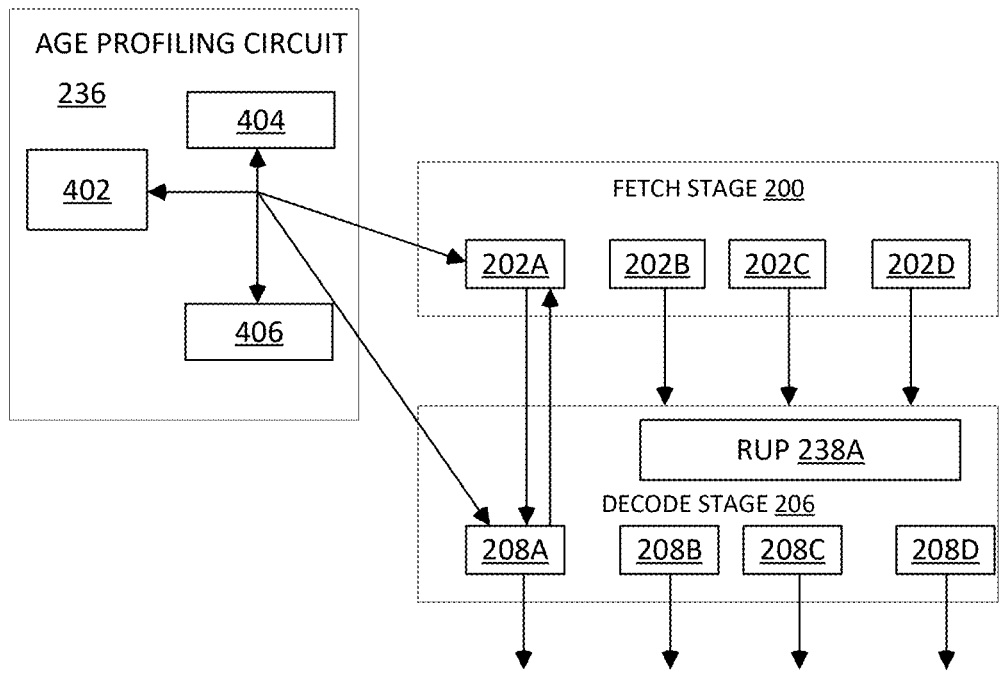
FIG. 4 includes a block diagram from FIG. 2 in addition to a more detailed depiction of the age profiling circuit in FIG. 2 to facilitate a discussion of exemplary measurements performed on an equivalent processing circuit in a decode pipeline stage of the processing unit of FIG. 2.

FIG. 4 includes the block diagram 200 from FIG. 2 in addition to a more detailed depiction of the age profiling circuit 236 in FIG. 2 to facilitate a discussion of exemplary measurements performed on the equivalent processing circuit 208A in the decode pipeline stage 206 of the PU 104(0) of FIG. 2. The age profiling circuit 236 includes a control unit 402, an age measuring unit 404, and an enhanced built-in self-test (EBIST) unit 406. The control unit 402 controls the selection and isolation of respective equivalent processing circuits that need to be measured for performance factors indicative of aging. The EBIST unit 406 includes conventional built-in self-test techniques for determining whether an equivalent processing circuit is operational or not by sending a test pattern as input to a respective equivalent processing circuit and testing whether a returned result from the respective equivalent processing circuit matches an expected result for the test pattern. The EBIST unit 406 is also coupled to the age measuring unit 404 to measure and determine performance factors indicative of aging. In this regard, the control unit 402 determines a particular pipeline stage to test and retrieves a test pattern from the cache memory system 110 or system memory 120 for the equivalent processing circuits in the particular pipeline stage. The control unit 402 triggers the age measuring unit 404 to start a timer. The age measuring unit 404 triggers the EBIST unit 406 to send the test pattern to the individual equivalent processing circuits to the particular pipeline stage. The timer measures the time taken by each of the individual equivalent processing circuits to process the test pattern. The EBIST unit 406 or the equivalent processing circuit being profiled will signal the timer in the age measuring unit 404 when the test pattern is completed by a respective equivalent processing circuit. The control unit 402 determines a performance factor indicative of aging for each equivalent processing circuit based on the time each of the equivalent processing circuits completes the test pattern. The control unit 402 stores age information either as performance factors in the age profiling circuit 236 or the resource utilization priority circuit of the tested pipeline stage for the measured equivalent processing circuits or as a list of the measured equivalent processing circuits ordered based on age. The control unit 402 may store the age information in system memory 120 in case the measurement is not done on each boot of the multi-processor 102.

In this example, the control unit 402 selects equivalent processing circuit 208A (aka decoder circuit). Since the equivalent processing circuit 208A decodes instructions from equivalent processing circuit 202A (aka instruction queue), the control unit 402 also isolates the equivalent processing circuit 202A. The EBIST unit 406 provides a vector of instructions to the equivalent processing circuit 202A (aka instruction queue). The vector includes instructions sequenced to exercise the critical paths and most used paths in the equivalent processing circuit 208A. The instruction mix in the vector includes arithmetic, logical, and conditional instructions. The vector can be as long as hundreds of instructions. The age measuring unit 404 starts a timer to track the time it takes for the equivalent processing circuit 208A to decode the vector and triggers the equivalent processing circuit 208A to begin decoding the first instruction in the vector in the equivalent processing circuit 202A (aka instruction queue). While the equivalent processing circuit 208A is being age profiled, it is configured to run in a self-clocking mode. In self-clocking mode, the equivalent processing circuit 208A governs the speed at which it decodes instructions from the vector such that it reads the next instruction after completing the present instruction. After the equivalent processing circuit 208A completes decoding an instruction, a decode complete signal is asserted for the equivalent processing circuit 208A to decode the next instruction from the equivalent processing circuit 202A (aka instruction queue). The equivalent processing circuit 208A continues decoding instructions from the vector until the last instruction in the vector is decoded, at which point, the equivalent processing circuit 208A triggers the age measuring unit 404 to stop its timer and end the age profiling for the equivalent processing circuit 208A. The age measuring unit 404 stores the number of timer cycles the equivalent processing circuit 208A took to decode the vector of instructions. An age performance factor for the equivalent processing circuit 208A, in this example, may be the number of timer cycles for decoding the vector of instructions or it may be an algorithmic function based on the number of timer cycles for decoding the vector of instructions. The same age profiling approach is used to profile equivalent processing circuits 208B-208D. The age measuring unit 404 also stores the age performance factors of the equivalent processing circuits 208B-208D. The age profiling factors may also or alternatively be stored in the RUP circuit 238A.

Figure 5:
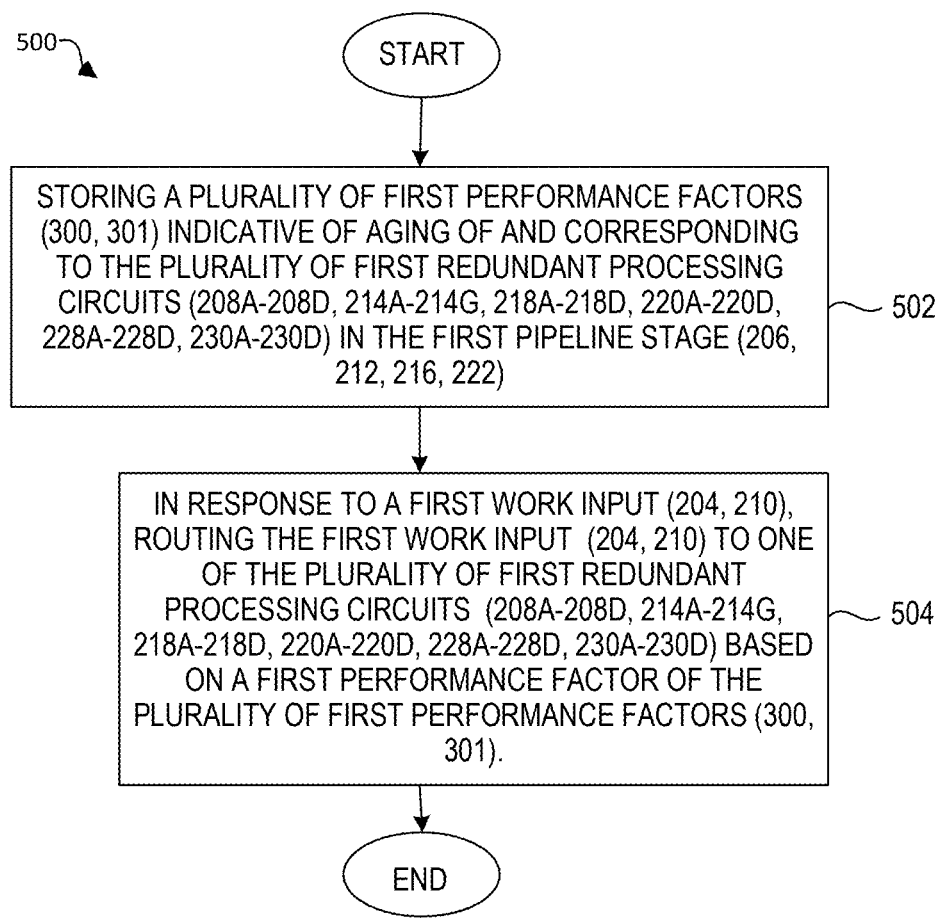
FIG. 5 is a flowchart illustrating an exemplary process for maintaining approximate uniformity of aging of equivalent processing circuits in a pipeline stage in a processor, including the processor in FIG. 1 and the PU in FIG. 2.

FIG. 5 is a flowchart illustrating an exemplary process 500 for maintaining approximate uniformity of aging of equivalent processing circuits in a pipeline stage in a processor, including the processor in FIG. 1 and the processing unit in FIG. 2. In this regard, a first exemplary step in the process 500 of FIG. 5 can include storing a plurality of first performance factors 300, 301 indicative of aging of and corresponding to the plurality of first redundant processing circuits 208A-208D, 214A-214G, 218A-218D, 220A-220D, 228A-228D, 230A-230D in the first pipeline stage 206, 212, 216, 222 (block 502). A next step in the process 500 can include, in response to a first work input 204, 210, routing the first work input 204, 210 to one of the plurality of first redundant processing circuits 208A-208D, 214A-214G, 218A-218D, 220A-220D, 228A-228D, 230A-230D based on a first performance factor of the plurality of first performance factors 300, 301 (block 504).

Electronic devices that include an exemplary processor-based system such as the processor-based system 100 in FIG. 1 that includes multiple PUs and a memory system that includes a cache memory system including a hierarchy of local and shared cache memories and a system memory, and wherein the processor-based system includes an exemplary AMC such as the AMC 114 in FIGS. 1-2 to route, based on stored performance factors of equivalent processing circuits in a pipeline stage, input work to maintain approximate uniformity of aging of the equivalent processing circuits and according to, but not limited to, any of the exemplary processes such as the process 500 of FIG. 5, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, and a multicopter.

Figure 6:
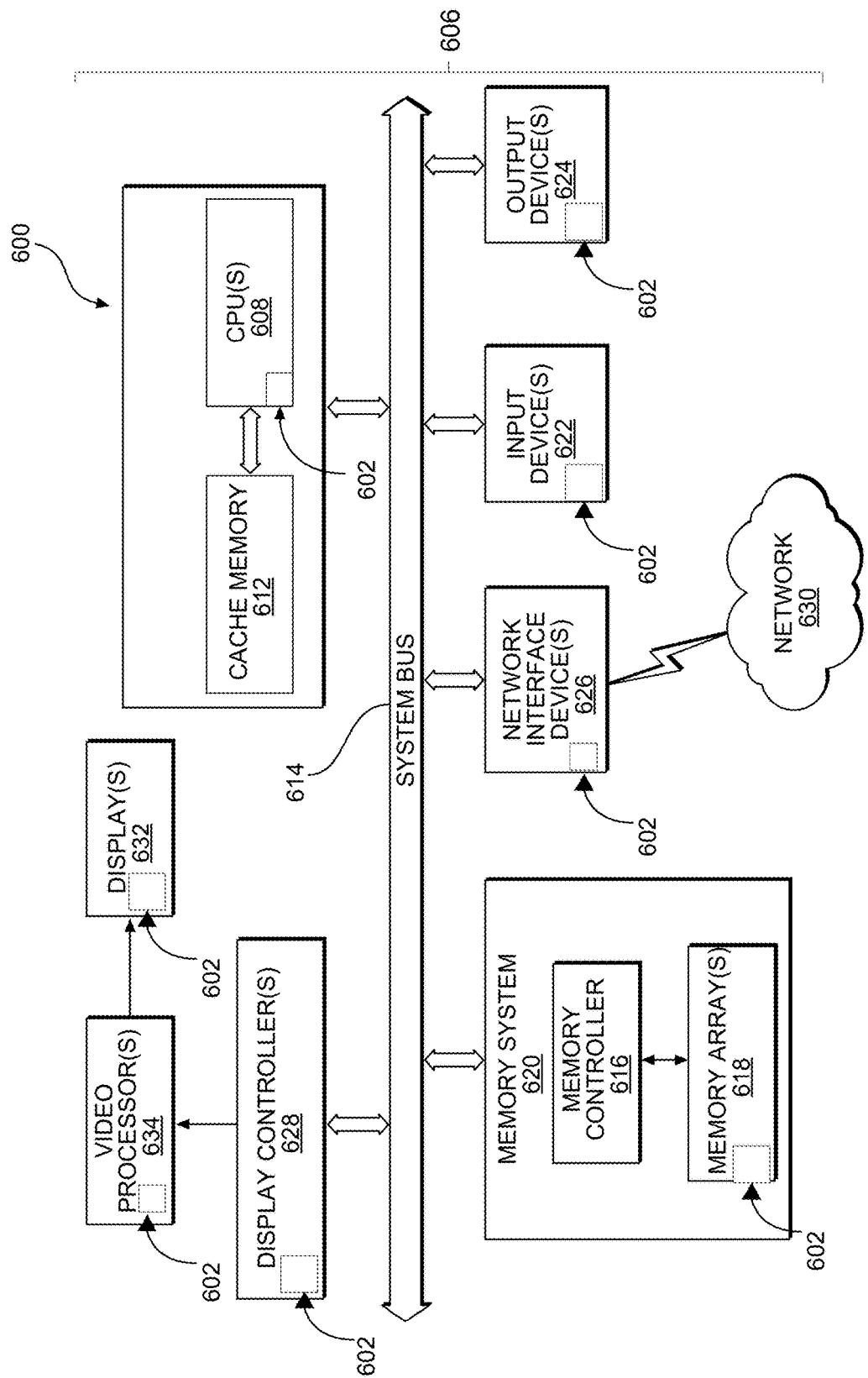
FIG. 6 is a block diagram of an exemplary processor-based system that can include multiple PUs and a memory system that includes a cache memory system including a hierarchy of local and shared cache memories and a system memory, and wherein the processor-based system includes an exemplary AMC to route, based on stored performance factors of equivalent processing circuits in a pipeline stage, input work to maintain approximate uniformity of aging of the equivalent processing circuits, and according to, but not limited to, any of the exemplary processes including the process in FIG. 5, and according to any exemplary aspects disclosed herein.

In this regard, FIG. 6 illustrates an example of a processor-based system 600 that can include multiple PUs and a memory system that includes a cache memory system including a hierarchy of local and shared cache memories and a system memory, and wherein the processor-based system 600 includes an exemplary AMC 602, such as the AMC 114 in FIGS. 1-2, to route, based on stored performance factors of equivalent processing circuits in a pipeline stage, input work to maintain approximate uniformity of aging of the equivalent processing, and according to, but not limited to, the exemplary process 500 in FIG. 5, and according to any exemplary aspects disclosed herein. In this example, the processor-based system 600 may be formed as an integrated circuit (IC) [604] as a system-on-a-chip (SoC) 606 in one or more processing units such as a central processing unit (CPU) 608. The processor-based system 600 includes the CPU 608 that includes one or more PU(s), which may also be referred to as CPU cores or processor cores. The CPU 608 may have cache memory 612 coupled to the CPU 608 for rapid access to temporarily stored data. The CPU 608 is coupled to a system bus 614 and can intercouple master and slave devices included in the processor-based system 600. As is well known, the CPU 608 communicates with these other devices by exchanging address, control, and data information over the system bus 614. For example, the CPU 608 can communicate bus transaction requests to a memory controller 616, as an example of a slave device. Although not illustrated in FIG. 6, multiple system buses 614 could be provided, wherein each system bus 614 constitutes a different fabric.

Other master and slave devices can be connected to the system bus 614. As illustrated in FIG. 6, these devices can include a memory system 620 that includes the memory controller 616 and a memory array(s) 618, one or more input devices 622, one or more output devices 624, one or more network interface devices 626, and one or more display controllers 628, as examples. Each of the memory system(s) 620, the one or more input devices 622, the one or more output devices 624, the one or more network interface devices 626, and the one or more display controllers 628 can be provided in the same or different processor-based system 600. The input device(s) 622 can include any type of input device, including, but not limited to, input keys, switches, voice processors, etc. The output device(s) 624 can include any type of output device, including, but not limited to, audio, video, other visual indicators, etc. The network interface device(s) 626 can be any device configured to allow exchange of data to and from a network 630. The network 630 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 626 can be configured to support any type of communications protocol desired.

The CPU 608 may also be configured to access the display controller(s) 628 over the system bus 614 to control information sent to one or more displays 632. The display controller(s) 628 sends information to the display(s) 632 to be displayed via one or more video processor(s) 634, which process the information to be displayed into a format suitable for the display(s) 632. The display controller(s) 628 and video processor(s) 634 can be included as ICs in the same or different processor-based system 600, as an example. The display(s) 632 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor, comprising:
    a first processing unit comprising:
        a first pipeline comprising a plurality of first pipeline stages, a first pipeline stage of the plurality of first pipeline stages comprising a plurality of first equivalent processing circuits; and
        an age management circuit (AMC) configured to:
            store a plurality of first performance factors indicative of aging of and corresponding to the plurality of first equivalent processing circuits in the first pipeline stage; and
            in response to a first work input, route the first work input to one of the plurality of first equivalent processing circuits based on a first performance factor of the plurality of first performance factors.
2. The processor of clause 1, wherein the AMC is further configured to measure the plurality of first equivalent processing circuits to obtain the plurality of first performance factors.
3. The processor of clause 1 or 2, wherein:
    the first pipeline stage is a decode stage, and
    the plurality of first equivalent processing circuits is a plurality of decode circuits.
4. The processor of any of clauses 1-3, wherein the plurality of first performance factors includes throughput of the plurality of first equivalent processing circuits.
5. The processor of any of clauses 1-4, further comprising:
    a second pipeline stage of the plurality of first pipeline stages, the second pipeline stage comprising a plurality of second equivalent processing circuits,
    wherein the AMC is further configured to:
        store a plurality of second performance factors corresponding to the plurality of second equivalent processing circuits; and
        in response to a second work input to the second pipeline stage, route the second work input to one of the plurality of second equivalent processing circuits based on a second performance factor of the plurality of second performance factors.
6. The processor of any of clauses 1-5, wherein:
    the plurality of first pipeline stages comprises one or more pipeline stages comprising equivalent processing circuits; and
    the AMC further comprises a plurality of resource utilization and priority encoder circuits corresponding to the one or more pipeline stages.
7. The processor of any of clauses 1-6, wherein the AMC further comprises an age profiling circuit configured to:
    measure the plurality of first equivalent processing circuits; and
    determine the plurality of first performance factors indicative of the aging.
8. The processor of any of clauses 1-6, wherein the AMC further comprises an age profiling circuit configured, at boot-up of the first processing unit or at a scheduled time to reset the first processing unit, to:
    measure the plurality of first equivalent processing circuits; and
    determine the plurality of first performance factors indicative of the aging.

9. The processor of any of clauses 1-8, further comprising:
  a second processing unit comprising:
    a second pipeline comprising a plurality of second pipeline stages, a second pipeline stage of the plurality of second pipeline stages comprising a plurality of second equivalent processing circuits,
  wherein the AMC is further configured to:
    store a plurality of second performance factors corresponding to the plurality of second equivalent processing circuits in the second pipeline stage; and
    in response to a second work input, route the second work input to one of the plurality of second equivalent processing circuits based on a second performance factor of the plurality of second performance factors.

10. A method for maintaining approximate uniformity of aging of equivalent processing circuits in a first processing unit, the first processing unit comprising a first pipeline comprising a plurality of first pipeline stages, a first pipeline stage of the plurality of first pipeline stages comprising a plurality of first equivalent processing circuits, the method comprising:
  storing a plurality of first performance factors indicative of aging of and corresponding to the plurality of first equivalent processing circuits in the first pipeline stage; and
  in response to a first work input, routing the first work input to one of the plurality of first equivalent processing circuits based on a first performance factor of the plurality of first performance factors.

11. The method of clause 10, further comprising measuring the plurality of first equivalent processing circuits to obtain the plurality of first performance factors.

12. The method of clause 10 or 11, wherein:
  the first pipeline stage is a decode stage, and
  the plurality of first equivalent processing circuits is a plurality of decode circuits.

13. The method of any of clauses 10-12, wherein the plurality of first performance factors includes throughput of the plurality of first equivalent processing circuits.

14. The method of any of clauses 10-13, wherein the first processing unit further comprises a second pipeline stage of the plurality of first pipeline stages, the second pipeline stage comprising a plurality of second equivalent processing circuits, the method further comprising:
  storing a plurality of second performance factors corresponding to the plurality of second equivalent processing circuits; and
  in response to a second work input to the second pipeline stage, routing the second work input to one of the plurality of second equivalent processing circuits based on a second performance factor of the plurality of second performance factors.

15. The method of any of clauses 10-14, further comprising:
  measuring the plurality of first equivalent processing circuits; and
  determining the plurality of first performance factors indicative of the aging.

16. The method of any of clauses 10-14, further comprising, at boot-up of the first processing unit or at a scheduled time to reset the first processing unit:
  measuring the plurality of first equivalent processing circuits; and
  determining the plurality of first performance factors indicative of the aging.

17. The method of any of clauses 10-15, further comprising:
  storing a plurality of second performance factors corresponding to a plurality of second equivalent processing circuits in a second pipeline stage of a plurality of second pipeline stages in a second pipeline of a second processing unit; and
  in response to a second work input, routing the second work input to one of the plurality of second equivalent processing circuits based on a second performance factor of the plurality of second performance factors.

18. A processor for maintaining approximate uniformity of aging of equivalent processing circuits in a first processing unit, the first processing unit comprising a first pipeline comprising a plurality of first pipeline stages, a first pipeline stage of the plurality of first pipeline stages comprising a plurality of first equivalent processing circuits, the processor comprising:
  means for storing a plurality of first performance factors indicative of aging of and corresponding to the plurality of first equivalent processing circuits in the first pipeline stage; and
  in response to a first work input, means for routing the first work input to one of the plurality of first equivalent processing circuits based on a first performance factor of the plurality of first performance factors.

19. The processor of clause 18, further comprising means for measuring the plurality of first equivalent processing circuits to obtain the plurality of first performance factors.

20 The processor of clause 18, further comprising:
  means for measuring the plurality of first equivalent processing circuits; and
  means for determining the plurality of first performance factors indicative of the aging.

What is claimed is:
1. A processor, comprising:
  a first processing unit comprising:
    a first pipeline comprising a plurality of first pipeline stages, a first pipeline stage of the plurality of first pipeline stages comprising a plurality of first equivalent processing circuits; and
    a hardware age management circuit (AMC) configured to:
      store a plurality of first performance factors indicative of aging of and corresponding to the plurality of first equivalent processing circuits in the first pipeline stage; and
      in response to a first work input, route the first work input to one of the plurality of first equivalent processing circuits based on a first performance factor of the plurality of first performance factors.

2. The processor of claim 1, wherein the hardware AMC is further configured to measure the plurality of first equivalent processing circuits to obtain the plurality of first performance factors.

3. The processor of claim 1, wherein:
  the first pipeline stage is a decode stage; and
  the plurality of first equivalent processing circuits is a plurality of decode circuits.

4. The processor of claim 1, wherein the plurality of first performance factors includes throughput of the plurality of first equivalent processing circuits.

5. The processor of claim 1, further comprising:
a second pipeline stage of the plurality of first pipeline stages, the second pipeline stage comprising a plurality of second equivalent processing circuits,
wherein the hardware AMC is further configured to:
store a plurality of second performance factors corresponding to the plurality of second equivalent processing circuits;
receive a second work input at the second pipeline stage; and
in response to the second work input received at the second pipeline stage, route the second work input to one of the plurality of second equivalent processing circuits based on a second performance factor of the plurality of second performance factors.

6. The processor of claim 1, wherein:
the plurality of first pipeline stages comprises one or more pipeline stages comprising equivalent processing circuits; and
the hardware AMC comprises a plurality of resource utilization and priority encoder circuits corresponding to the one or more pipeline stages.

7. The processor of claim 6, wherein the hardware AMC further comprises an age profiling circuit configured to:
measure the plurality of first equivalent processing circuits; and
determine the plurality of first performance factors indicative of the aging.

8. The processor of claim 6, wherein the hardware AMC further comprises an age profiling circuit configured, at boot-up of the first processing unit or at a scheduled time to reset the first processing unit, to:
measure the plurality of first equivalent processing circuits; and
determine the plurality of first performance factors indicative of the aging.

9. The processor of claim 1, further comprising:
a second processing unit comprising:
a second pipeline comprising a plurality of second pipeline stages, a second pipeline stage of the plurality of second pipeline stages comprising a plurality of second equivalent processing circuits,
wherein the hardware AMC is further configured to:
store a plurality of second performance factors corresponding to the plurality of second equivalent processing circuits in the second pipeline stage; and
in response to a second work input, route the second work input to one of the plurality of second equivalent processing circuits based on a second performance factor of the plurality of second performance factors.

10. A method for maintaining approximate uniformity of aging of equivalent processing circuits in a first processing unit, the first processing unit comprising a first pipeline comprising a plurality of first pipeline stages, a first pipeline stage of the plurality of first pipeline stages comprising a plurality of first equivalent processing circuits, the method comprising:
storing a plurality of first performance factors indicative of aging of and corresponding to the plurality of first equivalent processing circuits in the first pipeline stage; and
in response to a first work input, routing the first work input to one of the plurality of first equivalent processing circuits based on a first performance factor of the plurality of first performance factors.

11. The method of claim 10, further comprising measuring the plurality of first equivalent processing circuits to obtain the plurality of first performance factors.

12. The method of claim 10, wherein:
the first pipeline stage is a decode stage; and
the plurality of first equivalent processing circuits is a plurality of decode circuits.

13. The method of claim 10, wherein the plurality of first performance factors includes throughput of the plurality of first equivalent processing circuits.

14. The method of claim 10, wherein the first processing unit further comprises a second pipeline stage of the plurality of first pipeline stages, the second pipeline stage comprising a plurality of second equivalent processing circuits, the method further comprising:
storing a plurality of second performance factors corresponding to the plurality of second equivalent processing circuits;
receiving a second work input at the second pipeline stage; and
in response to receiving the second work input at the second pipeline stage, routing the second work input to one of the plurality of second equivalent processing circuits based on a second performance factor of the plurality of second performance factors.

15. The method of claim 10, further comprising:
measuring the plurality of first equivalent processing circuits; and
determining the plurality of first performance factors indicative of the aging.

16. The method of claim 10, further comprising, at boot-up of the first processing unit or at a scheduled time to reset the first processing unit:
measuring the plurality of first equivalent processing circuits; and
determining the plurality of first performance factors indicative of the aging.

17. The method of claim 10, further comprising:
storing a plurality of second performance factors corresponding to a plurality of second equivalent processing circuits in a second pipeline stage of a plurality of second pipeline stages in a second pipeline of a second processing unit; and
in response to a second work input, routing the second work input to one of the plurality of second equivalent processing circuits based on a second performance factor of the plurality of second performance factors.

18. A processor for maintaining approximate uniformity of aging of equivalent processing circuits in a first processing unit, the first processing unit comprising a first pipeline comprising a plurality of first pipeline stages, a first pipeline stage of the plurality of first pipeline stages comprising a plurality of first equivalent processing circuits, the processor comprising:
means for storing a plurality of first performance factors indicative of aging of and corresponding to the plurality of first equivalent processing circuits in the first pipeline stage; and
in response to a first work input, means for routing the first work input to one of the plurality of first equivalent processing circuits based on a first performance factor of the plurality of first performance factors.

19. The processor of claim 18, further comprising means for measuring the plurality of first equivalent processing circuits to obtain the plurality of first performance factors.

20. The processor of claim 18, further comprising:
means for measuring the plurality of first equivalent processing circuits; and
means for determining the plurality of first performance factors indicative of aging.

* * * * *